Figure 1:
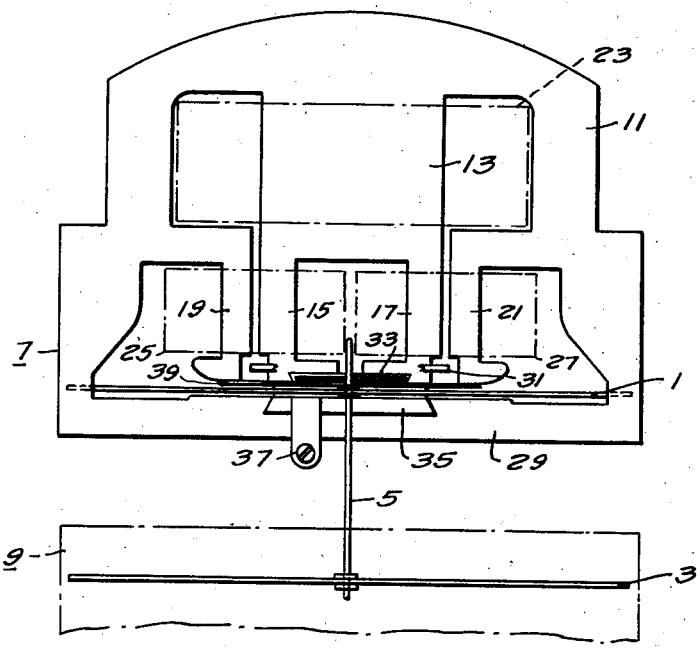

Sept. 26, 1944.    R. M. LEIPPE    2,359,129
POLYPHASE METER
Filed March 25, 1942

WITNESSES:
E. A. McCloskey
C. L. Freedman

INVENTOR
Richard M. Leippe.
BY
ATTORNEY

Patented Sept. 26, 1944

2,359,129

UNITED STATES PATENT OFFICE 2,359,129

POLYPHASE METER

Richard M. Leippe, Cedar Grove, N. J., assignor to Westinghouse Electric & Manufacturing Company, East Pittsburgh, Pa., a corporation of Pennsylvania Application March 25, 1942, Serial No. 436,075

5 Claims. (Cl. 171—264)

This invention relates to electrical measuring devices and it has particular relation to alternating current induction watt-hour meters for measuring the energy flowing in polyphase electrical circuits.

In electrical measuring instruments, adjustments customarily are provided to compensate for errors introduced by variations in materials and variations in dimensions within permissible manufacturing tolerances. For example, in a polyphase watt-hour meter two or more watt-hour meter electromagnets are positioned to apply torques to different portions of a common electroconductive armature or to separate armatures carried by a common shaft. In such a meter, it is desirable that when the electro-magnets are similarly energized they apply similar torques to the associated armature or armatures.

Because of the possible variations in materials and dimensions previously set forth, it is customary to provide polyphase watt-hour meters with phase balance or torque balance adjusting units. Units of this type are disclosed in the Oman Patent 1,702,450 and the Mylius et al. Patent 2,057,443. By manipulation of such adjusting units, the electromagnets of a polyphase watt-hour meter may be adjusted to apply similar torques to the associated armature or armatures when the electromagnets are similarly energized.

I have found that operation of a conventional phase balance or torque balance adjusting unit may result in a substantial variation in the power factor of a watt-hour meter electromagnet. As here employed the expression "power factor" refers to the phase displacement between the voltage and current magnetic fluxes produced respectively by the voltage and current windings of a watt-hour meter electromagnet.

In accordance with the invention, a phase balance or torque balance adjustment unit is provided with means for neutralizing variations in the power factor of an associated watt-hour meter electromagnet resulting from operation of the adjustment unit. Such means may take the form of an electroconductive member positioned to lag a portion of the magnetic flux in the air gap of the associated electromagnet. The electroconductive member is connected to the adjustment unit for movement in accordance with the degree of adjustment thereof to lag a variable amount of magnetic flux. By proper construction of the electroconductive member, the member may be proportioned to compensate for the variations in power factor resulting from adjusting of the phase balance or torque balance of the associated watt-hour meter.

It is therefore an object of the invention to provide improved adjustment means for an electrical measuring device.

It is a further object of the invention to provide an electrical measuring device having an adjustment unit which modifies a plurality of characteristics of the measuring device with means for neutralizing the effect of the adjustment unit on certain of such characteristics.

It is a still further object of the invention to provide a watt-hour meter having phase balance or torque balance adjusting means with means for compensating for the effects of such adjusting means on the power factor of the associated watt-hour meter.

It is another object of the invention to provide a watt-hour meter having a phase balance or torque balance adjustable magnetic plate with an electroconductive lagging member disposed for movement in accordance with movement of the plate to compensate for the effect of movement of the plate on the power factor of the watt-hour meter.

Figure 2:
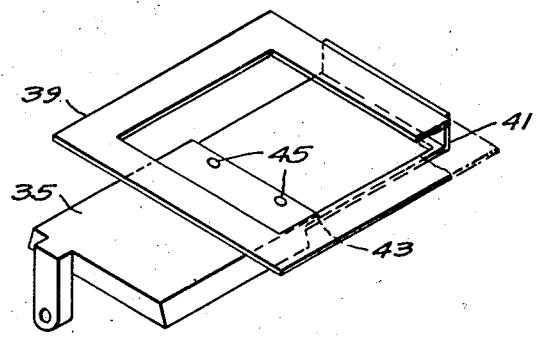

Other objects of the invention will be apparent from the following description taken in conjunction with the accompanying drawing, in which:

Figure 1 is a view in front elevation with parts broken away of a watt-hour meter embodying the invention, and Fig. 2 is a detail view in perspective with parts broken away of an adjustment unit suitable for the watt-hour meter of Fig. 1.

Referring to the drawing, Fig. 1 shows a polyphase watt-hour meter having an armature assembly including a pair of electroconductive disks 1 and 3 mounted on a common shaft 5. It will be understood that the armature disks 1 and 3 and the shaft 5 are mounted for rotation as a unit.

For rotating the armature assembly, a pair of electromagnets 7 and 9 are associated respectively with the armature disks 1 and 3. The electromagnet 7 includes a magnetic core 11 having a voltage pole 13, which is divided into two sections 15 and 17. The magnetic core 11 also has extensions 19 and 21 respectively adjacent the sections 15 and 17. Each extension 19 or 21 and its associated section 15 or 17 constitutes one current pole for the electromagnet 7.

Energization for the magnetic core 11 is derived from a voltage winding 23 which surrounds the voltage pole 13. Separate current windings 25 and 27 surround each of the extensions 19 and 21 and the associated section 15 or 17. It will be observed that the pole faces of the voltage and current poles are spaced from the base 29 of the magnetic core 11 to define an air gap within which the armature disk 1 is mounted for rotation.

As well understood in the art, energization of the voltage winding 23 and the current windings 25 and 27 in accordance with the voltage and current of an alternating current electrical circuit produces a shifting magnetic field in the air gap containing the armature disk 1. As also well understood in the art, a quadrature or lag loop 31 surrounds the voltage pole 13 adjacent its pole face to establish a correct phase relationship between the voltage and current magnetic fluxes in the air gap. If desired, an overload magnetic shunt 33 may be positioned between the sections 15 and 17. This shunt is designed to saturate or operate with decreasing permeability when the magnetomotive force across the shunt exceeds a predetermined value.

The electromagnet 9 is substantially similar to the electromagnet 7 but is shown inverted in order to decrease the overall height of the resulting polyphase watt-hour meter. The construction thus far described is similar to that shown in the Bradshaw Patent 2,081,981 to which reference may be made for a detailed description of the polyphase watt-hour meter.

As previously explained, it is desirable that, when both of the electromagnets 7 and 9 are similarly energized, equal torques be applied to the armature disks 1 and 3. To this end, a phase balance or torque balance adjustment unit may be provided on either or both of the electromagnets. For example, a magnetic phase balance or torque balance adjustment plate 35 may be positioned for movement beneath the voltage pole 13 in a recess provided in the base 29. An adjusting screw 37 may be employed for effecting the desired adjustment of the plate 35. Such a construction of a phase balance or torque balance plate is disclosed in greater detail in the aforesaid Oman patent. As well understood in the art, reciprocation of the magnetic plate 35, with respect to the magnetic core 11, alters the magnetic reluctance offered to magnetic flux passing through the air gap containing the armature disk 1. Because of this variation in reluctance, movement of the plate 35 operates to vary the torque applied to the armature disk for any energization of the electromagnet 7.

Because of the variation in flux distribution resulting from movement of the magnetic plate 35, movements of the magnetic plate are accompanied by a substantial variation in the power factor of the electromagnet 7. As a specific example, it was found that a movement of the magnetic plate 35 sufficient to provide a 12% decrease in the torque applied to the armature disk 1 may be accompanied by a 6% decrease in the power factor of the electromagnet.

To neutralize the effect of movement of the magnetic plate 35 on the power factor of the electromagnet 7, an auxiliary electroconductive member 39 may be employed for lagging the voltage magnetic flux 9 or the current magnetic flux, or both the voltage and magnetic current fluxes. This electroconductive member 39 may be a continuous sheet of electroconductive material or it may be in the form of a loop. As a specific illustration, the magnetic member 39 is illustrated as a loop and may be referred to as an auxiliary quadrature or lag loop.

The auxiliary lag loop 39 is positioned beneath the voltage pole 13 and is disposed for movement across the face of the voltage pole in accordance with movement of the magnetic plate 35. Such movement may be effected by connecting the auxiliary lag loop 39 to the magnetic plate 35 in any suitable manner. In the specific example illustrated, an angular bracket 41 is attached at one end to the lag loop 39 and at its other end to a lip 43 projecting from the magnetic plate 35. The attachment may be effected in any suitable manner as by means of rivets 45.

If the bracket 41 is formed of an electroconductive relatively low resistance material, such as copper or bronze, it alone may suffice to provide the required increase in lagging of the electromagnet as the magnetic plate 35 is moved into its retracted position. Generally, however, additional compensation is required, and the auxiliary lag loop 39 may be proportioned to provide the necessary increased lagging. The auxiliary lag loop 39 may be formed of an electroconductive material such as copper or bronze.

It is believed that the operation of the watt-hour meter illustrated in the drawing is apparent from the foregoing description. As well understood in the art, each of the electromagnets 7 and 9 is energized in accordance with the voltage and current of a separate phase of a polyphase electrical circuit in order to measure the energy flowing therein. If it is found that with both of the electromagnets 7 and 9 equally energized the torques applied respectively thereby to the armature disks 1 and 3 differ, the phase balance plate 35 may be adjusted to bring the torques into balance. For example, let it be assumed that the electromagnet 7 under these conditions applies more torque to its disk than that applied by the electromagnet 9 to the disk 3. By manipulation of the adjusting screw 37 the magnetic plate 35 is retracted from its recess in the base 29 sufficiently to decrease the torque applied by the electromagnet 7 to its armature disk 1 until the torque equals that produced by the electromagnet 9.

The retraction of the magnetic plate 35 tends to decrease the lagging of the electromagnet 7. However, the movement of the magnetic plate 35 is accompanied by a movement of the auxiliary lag loop 39 to intercept a greater proportion of the magnetic flux entering the air gap of the electromagnet 7 from the voltage pole 13. By suitably proportioning the auxiliary lag loop 39, the increase in lagging resulting from the aforesaid movement of the lag loop compensates for the decrease in lagging which otherwise would be produced by movement of the magnetic plate 35.

Movement of the magnetic plate 35 in the reverse direction to increase the torque produced by the electromagnet 7 operates to move the auxiliary lag loop 39 to intercept less of the magnetic flux passing into the air gap from the voltage pole 13. Consequently, the decreased lagging of the lag loop 39 compensates for the increase in lagging resulting from the latter movement of the magnetic plate 35.

Although the invention has been described with reference to certain specific embodiments thereof, numerous modifications are possible. Therefore, the invention is to be restricted only by the appended claims when interpreted in view of the prior art.

I claim as my invention:

1. In an electrical measuring device having means for producing a plurality of magnetic fluxes coacting to form a shifting magnetic field, and having an electroconductive armature element mounted for rotation in said shifting magnetic field, adjusting means having an operating element operable for varying the effective magnitude of said shifting magnetic field to adjust the torque applied thereby to said armature element, said adjusting means also operating to vary the phase relationship between said magnetic fluxes, and means responsive to adjustment of said adjusting means by said operating element for neutralizing the effect of such adjustment on said relationship between said magnetic fluxes.

2. In an alternating current electrical measuring device having a magnetic structure provided with an air gap, a voltage winding associated with said magnetic structure for directing a first magnetic flux into said air gap, a current winding associated with said magnetic structure for directing a second magnetic flux into said air gap, said magnetic fluxes coacting to produce a shifting magnetic field in said air gap, means for establishing a predetermined phase relationship between said magnetic fluxes, and an electroconductive armature element mounted for rotation in said air gap under the influence of said shifting magnetic field, magnetic adjusting means associated with said magnetic structure and having an operating element operable for adjusting the torque applied to said armature element by said shifting magnetic field, said adjusting means operating additionally to vary the phase relationship between the magnetic fluxes, and adjustable phase lagging means responsive to adjustment of said magnetic adjusting means by said operating element for neutralizing the effect of such adjustment on said phase relationship.

3. In an alternating current electrical measuring device having a magnetic structure provided with an air gap, a voltage winding associated with said magnetic structure for directing a first magnetic flux into said air gap, a current winding associated with said magnetic structure for directing a second magnetic flux into said air gap, said magnetic fluxes coacting to produce a shifting magnetic field in said air gap, and an electroconductive armature element mounted for rotation in said air gap under the influence of said shifting magnetic field, magnetic adjusting means associated with said magnetic structure for adjusting the torque applied to said armature element by said shifting magnetic field, said adjusting means operating additionally to vary the phase relationship between said magnetic fluxes, and adjustable lagging means responsive to adjustment of said magnetic adjusting means for neutralizing the effect of such adjustment on said phase relationship, said lagging means comprising an electroconductive member positioned in the path of one of said magnetic fluxes for lagging at least a portion thereof, and means mounting said electroconductive member for movement in accordance with adjustment of said magnetic adjusting means to intercept and lag a variable portion of the associated magnetic flux.

4. In an alternating current electrical measuring device having a magnetic structure provided with magnetic voltage pole means and magnetic current pole means, said pole means having pole faces defining an air gap, a voltage winding associated with said voltage pole means and effective when energized in accordance with an alternating voltage for directing a voltage magnetic flux into said air gap, a current winding associated with said current pole means and effective when energized in accordance with an alternating current for directing a current magnetic flux into said air gap, said magnetic fluxes coacting to define a shifting magnetic field in said air gap, and an electroconductive armature element mounted for rotation in said air gap under the influence of said shifting magnetic field; an adjusting assembly comprising a magnetic member associated with said magnetic structure, and means mounting said magnetic member for movement relative to said magnetic structure to vary the magnetic reluctance offered to said magnetic fluxes and the resultant effective magnitude of said shifting magnetic field, movement of said magnetic member also operating to vary the phase displacement between said magnetic fluxes; and means for neutralizing said phase displacement resulting from movement of said magnetic member, said last-named means including an electroconductive member positioned in the path of at least part of one of said magnetic fluxes for lagging the magnetic flux intercepted thereby, and means connecting said electroconductive member to said adjusting assembly for movement in accordance with movement of said magnetic member to vary the amount of said intercepted magnetic flux sufficiently to compensate for the variation in said phase displacement resulting from movement of said magnetic member.

5. In an alternating current induction watthour meter having a magnetic structure including voltage and current poles positioned to define an air gap, a voltage winding associated with said voltage pole for directing a voltage magnetic flux through said voltage pole into said air gap, current windings associated with said current pole for directing a current magnetic flux through said current poles into said air gap, said magnetic fluxes cooperating to produce a shifting magnetic field in said air gap, means for adjusting the phase relationship between said magnetic fluxes, and an electroconductive armature element mounted for rotation in said air gap under the influence of said shifting magnetic field; a magnetic plate positioned for movement through said air gap adjacent said voltage pole in the path of at least part of said magnetic fluxes, movement of said magnetic plate operating to adjust the torque applied to said armature element by varying the magnetic reluctance offered to at least part of said magnetic fluxes, said movement operating further to vary the phase relationship between said magnetic fluxes; an electroconductive phase lag member positioned in said air gap, and means connecting said lag member to said magnetic plate for movement therewith to intercept and lag an increasing proportion of said voltage magnetic flux as said magnetic plate is moved to increase said magnetic reluctance, said lag member being proportioned to compensate for said variation of said phase relationship as said magnetic plate is moved.

RICHARD M. LEIPPE.